United States Patent [19]

Wells et al.

[11] Patent Number: 5,367,243
[45] Date of Patent: Nov. 22, 1994

[54] JUMPER CABLE ATTACHMENT FOR BATTERY

[76] Inventors: Mickey D. Wells, 8220 Breeze Cove La., Orlando, Fla. 32819; Mark E. McDonough, 1750 Thunderbird Trail, Maitland, Fla. 32751

[21] Appl. No.: 66,963

[22] Filed: May 25, 1993

Related U.S. Application Data

[63] Continuation-in-part of Ser. No. 815,248, Dec. 31, 1991, Pat. No. 5,214,368.

[51] Int. Cl.⁵ .................................................. H02J 7/00
[52] U.S. Cl. .......................................... 320/2; 320/25
[58] Field of Search ................... 320/2, 3, 4, 5, 6, 25, 320/26, 48; 307/10.7; 191/12.2 R

[56] References Cited

U.S. PATENT DOCUMENTS

| | | | |
|---|---|---|---|
| 3,963,972 | 6/1976 | Todd | 320/2 |
| 4,272,142 | 6/1981 | Zapf | 320/25 X |
| 4,489,223 | 12/1984 | Puckett et al. | 320/2 X |
| 4,791,347 | 12/1988 | Britton | 320/2 |
| 4,840,583 | 6/1989 | Moore | 320/25 X |
| 4,885,524 | 12/1989 | Wilburn | 320/25 |
| 4,902,955 | 2/1990 | Manis et al. | 320/2 |
| 4,924,176 | 5/1990 | Tremblay | 320/25 X |

*Primary Examiner*—Kristine L. Peckman
*Attorney, Agent, or Firm*—Warren L. Franz

[57] ABSTRACT

A standard automobile battery is modified to contain a set of retractable jumper cables, pre-attached to the positive and negative terminals of the battery. The cables are housed in a separate chamber formed either internally in a modified battery casing or externally in an auxiliary structure augmenting the usual casing. A bulb is connected across the cables to provide visual indication of good cable contact. Jumper clamps are made luminescent.

11 Claims, 3 Drawing Sheets

JUMPER CABLE ATTACHMENT FOR BATTERY

This is a continuation-in-part of application Ser. No. 07/815,248, filed Dec. 31, 1991, entitled "Jumper Ready Battery," now U.S. Pat. No. 5,214,368.

BACKGROUND OF THE INVENTION

This invention relates to batteries, in general; and, in particular, to apparatus for conveniently storing jumper cables in proximity to a vehicle battery for jump-starting the vehicle.

Several problems face the motorist, confronted with a "dead" battery, who seeks to jump-start an automobile. Jumper cables get lost, and are never with you when you need them. Establishing electrical connection using jumper cable clamps, between your automobile battery and the battery of another automobile is a nuisance. Battery posts are not always readily accessible, and knowing whether good contact has been made is always a problem, especially when (as is good safety practice) the last clamp attachment is made indirectly through the automobile frame. Unless good contact is confirmed, you can never be sure whether a breakdown is caused by a "dead" battery, or not.

The jumper cable attachment of the invention provides conveniently readily accessible jumper cables, that are easy to use and offer beneficial contact establishing advantages. The jumper cable attachment of the invention eliminates the need to carry a separate set of jumper cables.

SUMMARY OF THE INVENTION

In accordance with the invention a jumper cable attachment is provided for an automobile or similar battery, either internally or externally, to give significant jump start related improvements. The attachment includes a set of retractable jumper cables that are pre-attached to the positive and negative poles of the battery. The retractable cables are housed inside the battery or in an auxiliary structure closely associated with the battery. The battery clamps may be made luminescent, to glow in the dark. For contact confirmation purposes, the battery is augmented to include a small flashlight that can be used either as a mechanic's light or to assist in the jumping process. The retractable cables are preferably four gauge wire with a length of six to ten feet. In one illustrative embodiment, described in greater detail below, the cables are housed in a separate chamber formed within the battery casing itself. In other embodiments, a "jumper ready battery" is provided by means of a retractable cable fixture mounted as an add-on to a conventional battery housing.

BRIEF DESCRIPTION OF THE DRAWINGS

Embodiments of the invention have been chosen for purposes of illustration and description, and are shown in the accompanying drawings, wherein.

Throughout the drawings, like elements are referred to by like numerals.

DESCRIPTION OF PREFERRED EMBODIMENTS

Figure 1:
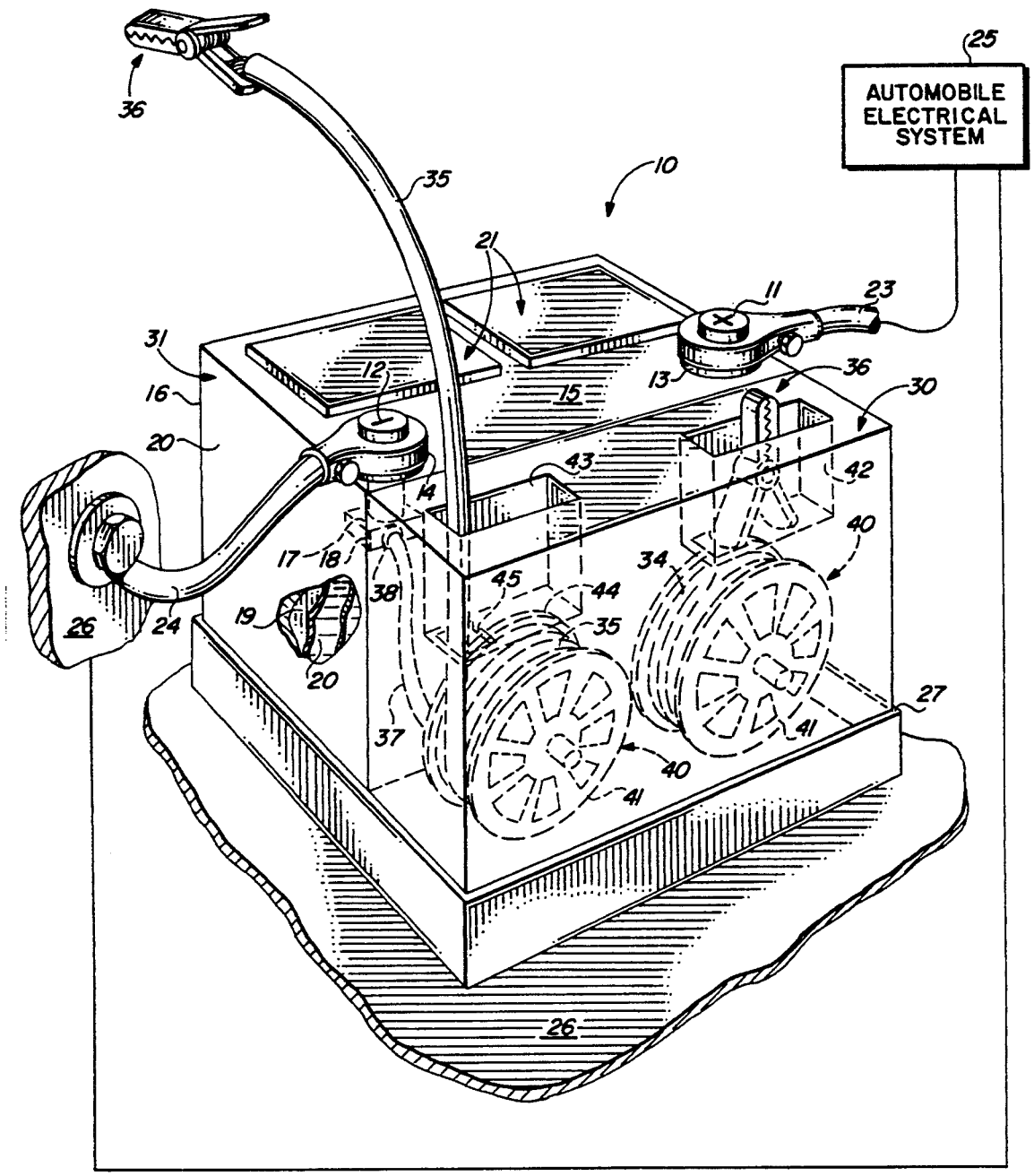
FIG. 1 is a view of a jumper cable attachment in accordance with the invention, incorporated as part of the battery itself.

As shown in FIG. 1, an automobile battery 10 includes positive and negative terminal posts 11, 12 connected via seals 13, 14 through cover 15 of a container 16 to post straps 17 and plate lugs 18 for electrical communication with plates 19 immersed in an electrolyte 20, such as a water-based solution of sulfuric acid. This connection is made in conventional manner, with caps 21 of vent plugs being located on the cover 15 to enable gas evacuation and replenishment of electrolyte. In conventional manner, conductors 23, 24 connect the battery terminals 11, 12, respectively, to positive and negative sides of an automobile electrical system 25; the negative connection being made, as is customary, by attachment of the conductor 24 to the automobile frame 26. The base of the battery casing 16 is supported in suitable fashion, such as in a tray 27 mounted on the frame 26. Well-known means (not shown) are utilized to lock the battery 10 within the tray 27.

In accordance with the invention, the container 16 includes a separate chamber 30, isolated from the electrolyte chamber 31, and within which jumper cables 34, 35 are stored. Each cable includes, at one end, an alligator clamp or similar mechanism 36 for establishing electrical contact between the associated cable 34, 35 and a corresponding positive or negative post of a remote battery of another automobile used for jumping purposes. For ease of manipulation in the dark, the handle parts of the clamps 36 are coated with a luminous material, such as phosphorescent paint. At its other end, each cable 34, 35 includes means for establishing electrical connection to the respective positive or negative pole 11, 12 of the battery 10. For the embodiment of FIG. 1, such communication is established by a lead 37 which electrically couples the inside end of the cable 34, 35 through a seal 38 to the appropriate post strap 17.

The cables 34, 35 are made retractable by attachment about a spool 41 of a retracting mechanism 40 mounted in the chamber 30. Suitable mechanisms 40 may be of a type such as used to retract the electrical cord of a canister vacuum cleaner (see, e.g., the cord reel assembly Part No. 700858 of a Kenmore vacuum cleaner, Model No. 116.2399182) or of a mechanic's guarded work lamp (see, e.g., the mechanism used to retract the cord of a commercially available Quality cord reel). The electrical connection of the lead 37 to the spool-mounted end of the jumper cables 34, 35 is made using brushes, rotating contacts, or similar known devices. To prevent retraction of the clamps 36 into the interior of chamber 30, so that they remain accessible, externally-opening cavities 42, 43 are formed in the cover 15 over the chamber 30. The cavities 42, 43 have open box-like constructions adapted for receiving a major portion of the clamps 36 therein. The bases 44 of the cavities 42, 43 have openings 45, dimensioned to pass the insulated wire portion of the cables 34, 35 but block movement of the clamps 36 into the interior of chamber 30.

For the embodiment illustrated in FIG. 1, the chamber 30 is formed integrally within the same container 16 as the chamber 31 which contains the conventional battery components. The clamps 36 will normally be located in conveniently accessible storage positions (as shown by the right clamp 36 in FIG. 1), within the open cavities 42, 43 formed in the cover 15. When it is desired to jump the battery 10, the cables 34, 35 are drawn out of the cavities 42, 43 (to a position such as shown by the left clamp 36 in FIG. 1) and attached in known manner to the corresponding posts of a remote battery or similar jumping source. Of course, normal safety procedures (such as attachment of the clamp 36 of the negative cable 35 to a frame rather than directly to the remote negative terminal post) must be observed. When the jumping procedure is completed, the clamps 36 are retrieved and the mechanisms 40 are operated to retract the insulated wire portions of the cables 34, 35 about the respective spring-loaded spools mounted for rotation within the chamber 30. The mechanisms 40 are advantageously of a spring-action, ratcheted-type which permit the cables to be withdrawn and held at any one of a plurality of selected uncoiled lengths. In the illustrated embodiment 10, each cable 34, 35 has its own associated retracting mechanism 40.

The described battery 10 provides security and convenience for the motorist, by enabling convenient location of the jumper cables 34, 35 at all times, with one end of each cable 34, 35 already situated in attachment with the associated battery posts 11, 12.

Figure 2:
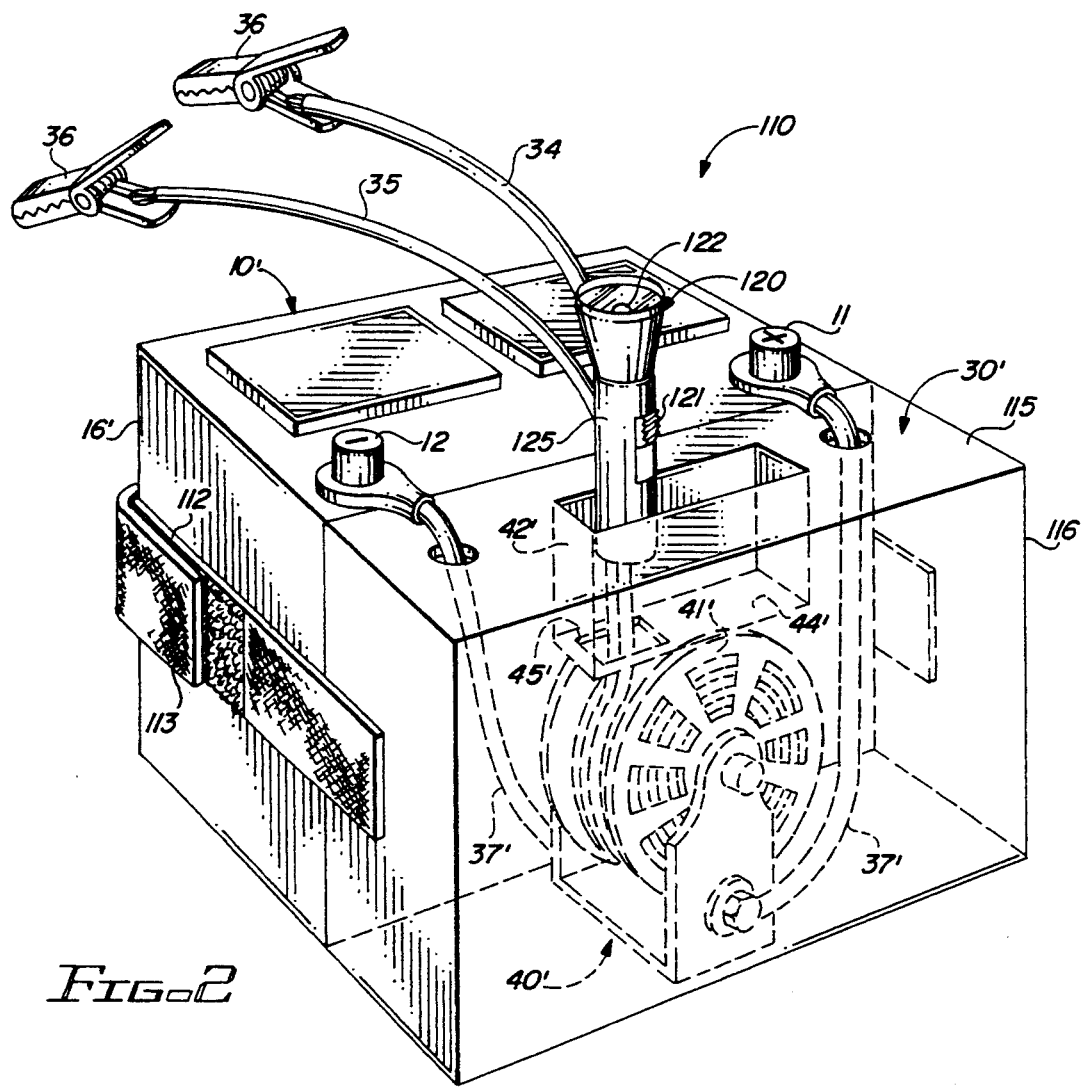
FIG. 2 is a view of a jumper cable attachment in the form of a battery add-on unit.
Figure 3:
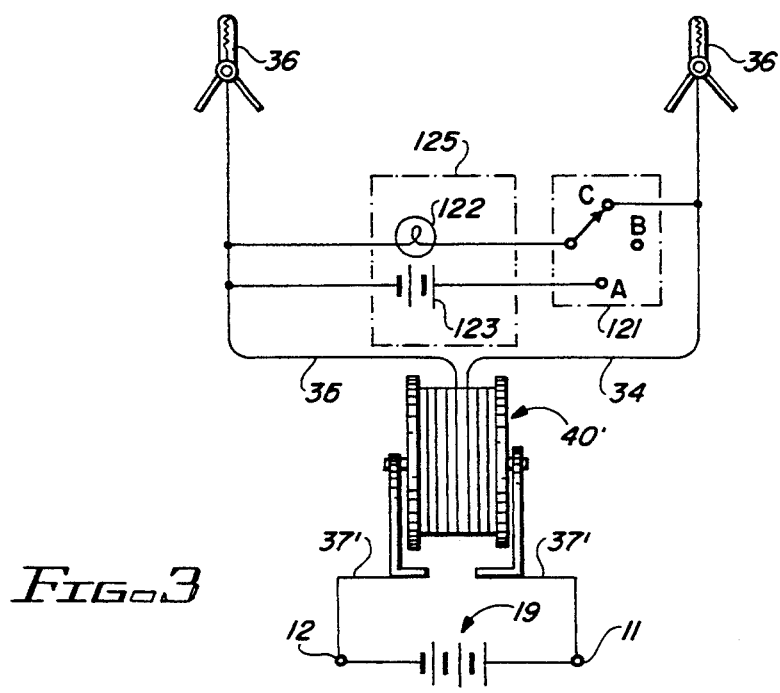
FIG. 3 is a circuit diagram of the attachment of FIG. 2.

FIGS. 2 and 3 illustrate another form 110 of a battery jumper cable attachment in accordance with the invention. The embodiment 110 is constructed using a conventional battery 10' to which an abutting separate chamber 30' has been added by attachment of an auxiliary container 116. The container 116 is dimensioned to match the casing of the conventional battery 10' and is suitably secured thereto by mating Velcro straps 112, 113, joined to opposite sides of casing 116 and wrapped about the casing 16' of battery 10'.

In variation of the structure of the embodiment 10, the embodiment 110 utilizes a single retracting mechanism 40' for retracting the cables 34, 35. The inner lengths of those cables are joined together and wrapped about a single spool 41', configured in accordance with known principles, to provide electrical attachment of the inner ends of cables 34, 35 to the respective positive and negative terminal posts 11, 12. For the illustrated structure, leads 37' connect externally to the posts 11, 12, thereby requiring no separate seals 38 as in FIG. 1.

According to another advantageous feature of the invention, a flashlight 120 is provided in conjunction with the cables 34, 35. The flashlight 120 includes a hand-operable switch 121 and a bulb 122, electrically connected as shown in FIG. 3. The switch 121 has three positions A, B, C, as indicated. Position A operates flashlight 120 so that bulb 122 is illuminated conventionally by a dry cell battery source 123 installed within the interior of the flashlight housing 125. Position B is the flashlight "off" position, whereby the bulb 122 is open-circuited. And, position C connects the bulb 122 between the cables 34, 35. With the switch 121 in position C, the conventional automobile battery terminals 11, 12, to which the auxiliary jumper housing casing 116 is attached, will operate the flashlight 120. Such connection provides significant advantages. First with a "live" battery 10', good connection between cables 37' and posts 11, 12 can be confirmed. With switch 121 in position C, bulb 122 will light only if good connection exists. Second, with a "dead" battery 10' good connection between clamps 36 and the terminals (i.e., terminal and automobile frame) of a remote jumping battery can be confirmed. With switch 121 in position C, bulb 122 will light only if good connection exists. It is very frustrating in jumping a "dead" battery, when there is no way to check whether the clamps are making adequate contact. Use of a visual indicator, such as the bulb 122 of flashlight 120 connected as shown in FIG. 3, provides the needed assurance.

A modified cavity 42', larger than cavities 42, 43, is formed in the cover 115 of the container 116 to receive both the flashlight 120 and clamps 36 in retrievable storage position. An opening 45' in the base wall 44' of cavity 42' permits the insulated wire portions of the cables 34, 35 and the narrow rear of flashlight 120 to pass into the interior of cavity 30', but does not pass the enlarged bulb end of the flashlight 120. The flashlight 120 can be secured to one or both of the insulated wire portions of the cables 34, 35, as shown, or may be mounted on its own separate insulated wire. Mounting the light 120 in this manner, provides a convenient retractable work light, operable off the automobile battery, for checking the engine. The negative clamp 36 can be attached to the automobile frame structure to hang the lamp.

Figure 4:
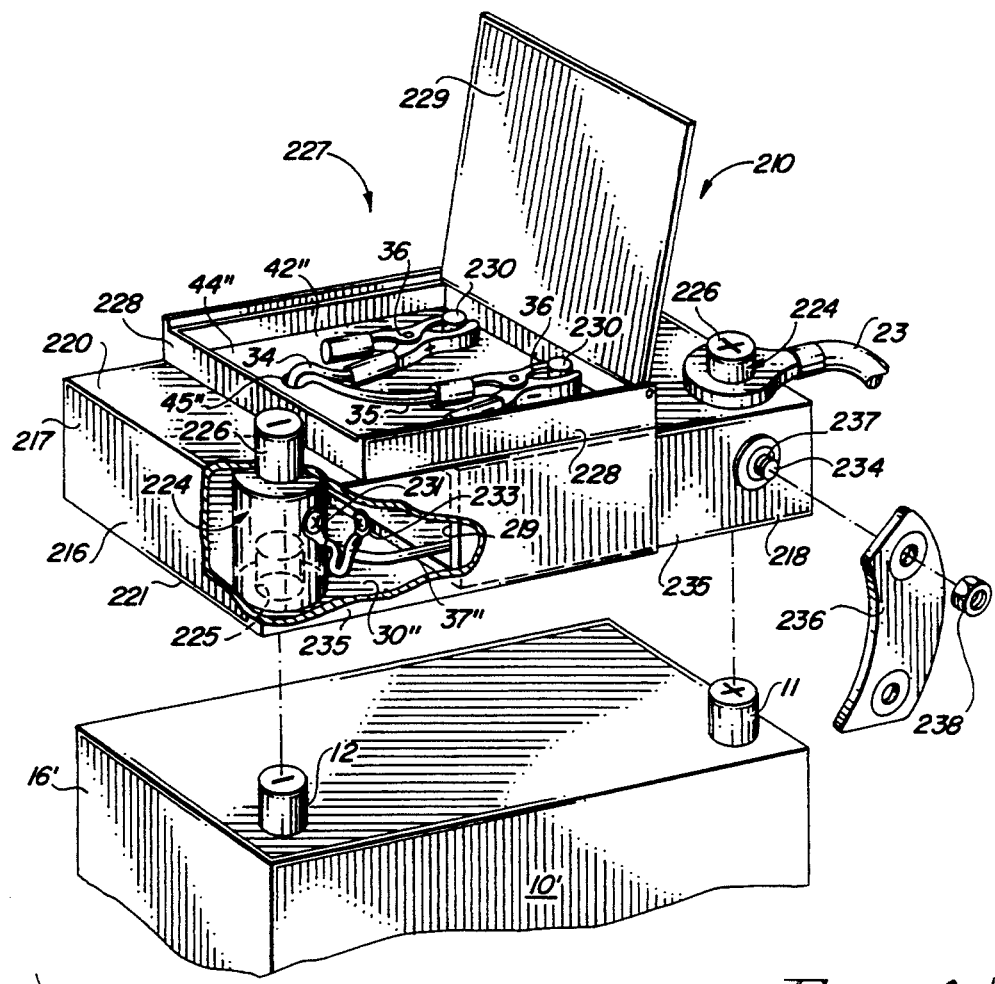
FIG. 4 is a view of another form of add-on attachment unit.

FIG. 4 illustrates yet another form 210 of a battery jumper cable attachment in accordance with the invention. The embodiment 210, like the embodiment 110 discussed above, takes the form of an add-on unit for attachment to the casing 16' of a conventional battery 10'. As with embodiment 110, a retracting mechanism 40' is housed within a chamber 30" defined by an auxiliary container 216. Unlike container 116, however, container 216 has a dimension which is made variable to match differences in spacing between terminals 11, 12 found in different battery sizes. Length adjustability is achieved by constructing container 216 in two parts 217, 218, one telescopingly received within the other. Each part 217, 218 has a box-like rectangular configuration, with a closed outer end and an open inner end. A cable retracting mechanism, which may be identical to the mechanism 40' of attachment 110, is located within the interior 219 of inner part 218 and clamps 36 are housed within a cavity 42" made accessible externally on outer part 217.

For the illustrated embodiment 210, each part 217, 218 includes horizontally extending upper and lower surfaces 220, 221, between corresponding extreme corners of which extend identical terminal displacement elements 224. Each element 224 comprises a block of conductive material including a downwardly opening vertical bore 225 at its bottom end and an upwardly directed vertical post 226 at its top end. Bore 225 is made accessible from the underside of surface 221 and is dimensioned to fit in electrical contact over a corresponding battery terminal post 11, 12. Post 226 projects upwardly through surface 220 and is dimensioned to simulate the corresponding post 11, 12 received within the associated bore 225.

The illustrated arrangement enables container 216 to be matched to the top of container 16' of battery 10' by positioning lower surface 221 over the top of battery 10', with one terminal displacement element 224 brought over battery terminal post 11 and the other terminal displacement element 224 brought over battery terminal post 12, with part 218 is shifted into or out of the open end of part 217 as needed to match the spacing of posts 11, 12. Conductors 23, 24 (see FIG. 1) can then be attached in vertically displaced positions to the upper end posts 226 of elements 224, instead of attaching them in conventional manner to the correspondingly dimensioned posts 11, 12 of the battery.

Clamps 36 may conveniently be housed within a cavity 42" formed by a rectangular compartment 227 made accessible centrally between projections 226 of elements 224 on upper surface 220 of container 216. Compartment 227 may comprise vertically extending walls 228, between opposing ones of which is pivotally mounted a lid 229 dimensioned, configured and adapted to normally cover the open top of compartment 227. Base 44" of compartment 227 has an opening 45" through which jumper cable leads 34, 35 extend into chamber 30" and cavity 219 for connection to the wind-up spool of the cable retraction mechanism. Opening 45" is large enough to enable the cables to be drawn therethrough, but is sufficiently small to block passage of clamps 36 into the interior of container 216. For the purpose of establishing a flat storage orientation of clamps 36 within the closed compartment 227, dummy posts 230 are located in laterally spaced positions away from opening 45". Walls 228 and dummy posts 230 are dimensioned, configured and adapted so that clamps 36 lay flat when attached to dummy posts 230 and lid 229 can be closed over clamps 36 and dummy posts 230, while maintaining a minimum height profile. Connection between clamp leads 34, 35 and terminal displacement conductive elements 224 is established by electrical connection of leads 37" between the retracting mechanism and points of attachment 231.

Accommodation is also made in apparatus 210 of FIG. 4, for electrical connection to terminals of batteries which are located in other than vertically extended positions. For the embodiment 210, each lead 37" is also connected through a conductive member 233 to a terminal connector 234 accessible through a side surface 235 of each telescoping part 217, 218. Electrical connection between terminal connector 234 and the battery posts can then be established by means of a conductor, such as the wire strap 236 which can be attached to a threaded protrusion 237 of connector 234 by a corresponding fastener 238.

Figure 5:
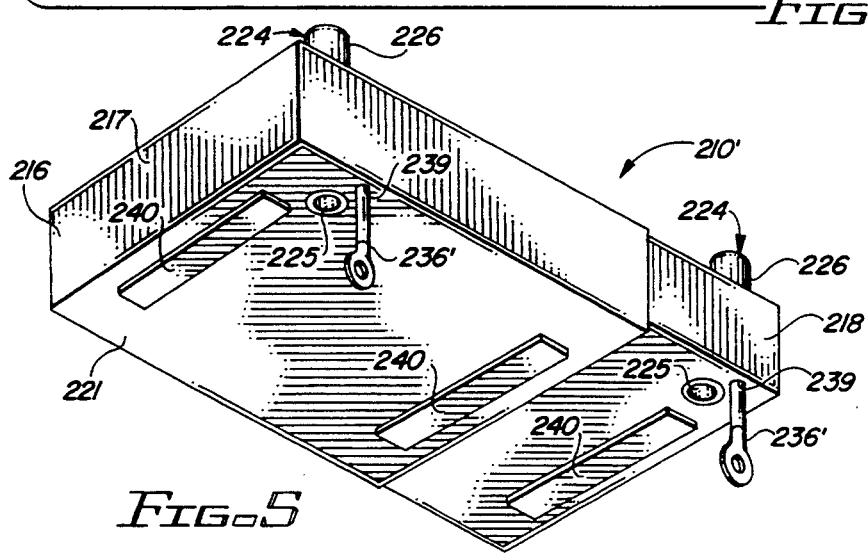
FIG. 5 is a view of a modified form of the attachment unit of FIG. 4.

FIG. 5 shows a modified embodiment 210' having conductive cables 236' which connect to elements 224 internally of container 216 and extend externally through openings 239. As shown in FIG. 5, the lower surface 221 of housing 216 can be provided with peel-off adhesive or other known permanent or removable bonding elements 240, for securing container 216, after size adjustment, to the top of battery 10'.

Those skilled in the art to which the invention relates will appreciate that other substitutions and modifications can be made to the described embodiment without departing from the spirit and scope of the invention as described by the claims below.

What is claimed is:

1. An add-on jumper cable attachment for a battery of a vehicle having a casing with positive and negative terminal posts projecting outwardly from said casing for establishing respective electrical communication with corresponding positive and negative sides of an electrical system of said vehicle, said attachment comprising:

a container defining a chamber and including positive and negative terminal displacement posts;

positive and negative jumper cables having first and second ends;

means connecting said cable first ends respectively to said terminal displacement posts;

clamping means, respectively connected to said cable second ends, for establishing contact with corresponding terminal posts of a remote battery of another vehicle; and means for automatically retracting said cables from extended positions drawn out of said chamber to storage positions retrieved into said chamber;

said terminal displacement posts having first ends dimensioned and configured for respectively fitting over and establishing electrical connection with said positive and negative battery terminal posts when said container is brought into abutment with said casing, and second ends electrically connected to said terminal displacement post first ends and dimensioned and configured for respectively simulating said positive and negative battery terminal posts when said terminal displacement post first ends are fitted over said positive and negative battery terminal posts, for establishing said electrical communication of said positive and negative battery terminal posts with said electrical system sides through said terminal displacement posts.

2. An attachment as in claim 1, wherein said container has two parts, telescopingly received one within the other; and wherein said positive terminal displacement post is located on one of said parts and said negative terminal displacement post is located on the other of said parts, so that said parts can be telescoped to vary spacing between said terminal displacement posts to match spacing of said positive and negative battery terminal posts.

3. An attachment as in claim 1, wherein said terminal displacement posts comprise blocks of conductive material; said blocks including downwardly opening vertical bores at said terminal displacement post first ends and upwardly directed vertical posts at said terminal displacement post second ends; said bores being accessible from an underside of said container and being dimensioned to fit over said positive and negative battery terminal posts; and said vertical posts being dimensioned to simulate said positive and negative battery terminal posts.

4. An attachment as in claim 1, wherein said means for automatically retracting is housed within said chamber; said container further includes a compartment and an opening between said compartment and said chamber; said cable first ends are connected to said terminal displacement posts within said chamber; said cables extend through said opening; said clamping means comprises clamps located outside of said chamber and that fit within said compartment; and said opening is large enough to enable said cables to be drawn therethrough, but sufficiently small to block passage of said clamping means into said chamber.

5. An attachment as in claim 4, wherein said container further comprises a lid for closing said compartment; and dummy posts located within said compartment, in spaced positions away from said opening; and wherein said compartment and dummy posts are dimensioned, configured and adapted so that said clamps can be attached to said dummy posts and said lid can be closed with said clamps in said compartment, when said cables are in said storage positions.

6. An attachment as in claim 1, wherein said cable first ends are also connected through said container to terminal connectors accessible from a side of said container; and means associated with said terminal connectors for establishing electrical connection between said terminal connectors and said positive and negative battery posts located on a side of said vehicle battery.

7. An attachment as in claim 6, wherein said means for establishing electrical connection comprises wire straps.

8. In combination, a vehicle having an electrical system with positive and negative connection points; a vehicle battery having a casing with a top surface and positive and negative terminal posts projecting outwardly, upwardly from said casing top surface; and a jumper cable attachment; said jumper cable attachment comprising:

a container brought into abutment over said battery casing top surface; said container defining a chamber and including positive and negative terminal displacement posts disposed in said container; and said terminal displacement posts comprising blocks of conductive material having downwardly opening vertical bores respectively brought into electrical contact over said battery terminal posts, and upwardly directed vertical posts simulating said battery terminal posts; means respectively electrically connecting said parts of said vehicle electrical system to said vertical posts;

positive and negative jumper cables having first and second ends;

means connecting said cable first ends respectively to said terminal posts;

clamping means, respectively connected to said cable second ends, for establishing contact with corresponding terminal posts of a remote battery of another vehicle; and means, located within said chamber, for automatically retracting said cables from extended positions drawn out of said chamber to storage positions retrieved into said chamber.

9. A combination as in claim 8, wherein said attachment container has two parts, telescopingly received one within the other; and wherein said positive terminal displacement post is located on one of said parts and said negative terminal displacement post is located on the other of said parts.

10. A combination as in claim 8, wherein said attachment container further includes a compartment and an opening between said compartment and said chamber; said cable first ends are connected to said terminal displacement posts within said chamber; said cables extend through said opening; said clamping means comprises clamps located outside of said chamber and that fit within said compartment; and said opening is large enough to enable said cables to be drawn therethrough, but sufficiently small to block passage of said clamping means into said chamber.

11. A combination as in claim 10, wherein said attachment container further comprises a lid for closing said compartment; and dummy posts located within said compartment, in spaced positions away from said opening; and wherein said compartment and dummy posts are dimensioned, configured and adapted so that said clamps can be attached to said dummy posts and said lid can be closed with said clamps in said compartment, when said cables are in said storage positions.

* * * * *